United States Patent [19]

Sengupta et al.

[11] Patent Number: 5,693,429

[45] Date of Patent: Dec. 2, 1997

[54] ELECTRONICALLY GRADED MULTILAYER FERROELECTRIC COMPOSITES

[75] Inventors: Louise C. Sengupta, Woburn; Eric Ngo, Brighton; Michelina E. O'Day, Woburn; Steven Stowell, Boston; Robert Lancto, Wakefield; Somnath Sengupta, Woburn, all of Mass.; Thomas V. Hynes, Nashua, N.H.

[73] Assignee: The United States of America as represented by the Secretary of the Army, Washington, D.C.

[21] Appl. No.: 647,260

[22] Filed: May 13, 1996

Related U.S. Application Data

[63] Continuation of Ser. No. 376,194, Jan. 20, 1995, abandoned.

[51] Int. Cl.$^6$ .......................................................... B32B 17/00
[52] U.S. Cl. ............................ 428/699; 428/701; 428/702
[58] Field of Search ................................ 428/699, 701, 428/702; 343/772; 501/137, 153

[56] References Cited

U.S. PATENT DOCUMENTS 5,312,790  5/1994  Sengupta .......................... 501/137

Primary Examiner—Timothy Speer
Attorney, Agent, or Firm—Freda L. Krosnick; Muzio B. Roberto

[57] ABSTRACT

A laminated ceramic ferroelectric material has adjacent layers of Barium Strontium Titanate (BSTO)—oxide composite stacked in order of descending oxide content and sized in thickness to produce a generally equal capacitance across each layer, resulting in a material having a graded dielectric constant for use in phased array antenna, for example. The oxides are from the metallic oxide group consisting of alumina, zirconia and magnesia and the layers are produced by tape casting.

16 Claims, 2 Drawing Sheets

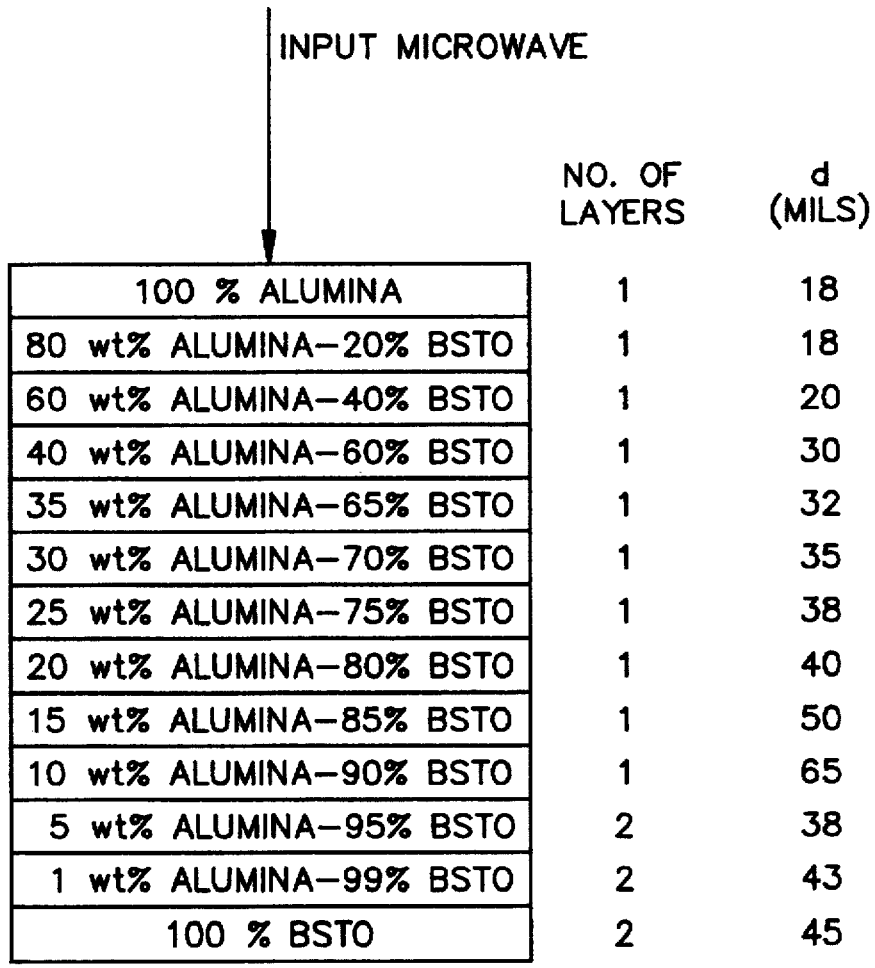

| | NO. OF LAYERS | d (MILS) |
|---|---|---|
| 100 % ALUMINA | 1 | 18 |
| 80 wt% ALUMINA–20% BSTO | 1 | 18 |
| 60 wt% ALUMINA–40% BSTO | 1 | 20 |
| 40 wt% ALUMINA–60% BSTO | 1 | 30 |
| 35 wt% ALUMINA–65% BSTO | 1 | 32 |
| 30 wt% ALUMINA–70% BSTO | 1 | 35 |
| 25 wt% ALUMINA–75% BSTO | 1 | 38 |
| 20 wt% ALUMINA–80% BSTO | 1 | 40 |
| 15 wt% ALUMINA–85% BSTO | 1 | 50 |
| 10 wt% ALUMINA–90% BSTO | 1 | 65 |
| 5 wt% ALUMINA–95% BSTO | 2 | 38 |
| 1 wt% ALUMINA–99% BSTO | 2 | 43 |
| 100 % BSTO | 2 | 45 |

INPUT MICROWAVE

INPUT MICROWAVE ↓

| Layer | NO. OF LAYERS | d (MILS) |
|---|---|---|
| 100 % ALUMINA | 1 | 18 |
| 80 wt% ALUMINA–20% BSTO | 1 | 18 |
| 60 wt% ALUMINA–40% BSTO | 1 | 20 |
| 40 wt% ALUMINA–60% BSTO | 1 | 30 |
| 35 wt% ALUMINA–65% BSTO | 1 | 32 |
| 30 wt% ALUMINA–70% BSTO | 1 | 35 |
| 25 wt% ALUMINA–75% BSTO | 1 | 38 |
| 20 wt% ALUMINA–80% BSTO | 1 | 40 |
| 15 wt% ALUMINA–85% BSTO | 1 | 50 |
| 10 wt% ALUMINA–90% BSTO | 1 | 65 |
| 5 wt% ALUMINA–95% BSTO | 2 | 38 |
| 1 wt% ALUMINA–99% BSTO | 2 | 43 |
| 100 % BSTO | 2 | 45 |

FIGURE 1

INPUT MICROWAVE ↓

| Composition | | NO. OF LAYERS | d (MILS) |
|---|---|---|---|
| 100% | | 1 | 18 |
| 80 wt% | −20% BSTO | 1 | 18 |
| 60 wt% | −40% BSTO | 1 | 20 |
| 50 wt% | −50% BSTO | 1 | 25 |
| 40 wt% | −60% BSTO | 1 | 30 |
| 35 wt% | −65% BSTO | 1 | 32 |
| 30 wt% | −70% BSTO | 1 | 35 |
| 25 wt% | −75% BSTO | 1 | 38 |
| 20 wt% | −80% BSTO | 1 | 40 |
| 15 wt% | −85% BSTO | 1 | 50 |
| 10 wt% | −90% BSTO | 1 | 65 |
| 5 wt% | −95% BSTO | 2 | 38 |
| 1 wt% | −99% BSTO | 2 | 38 |
| 100 % BSTO | | 2 | 43 |

FIGURE 2

ELECTRONICALLY GRADED MULTILAYER FERROELECTRIC COMPOSITES

This is a continuation of application Ser. No. 08/376,194, filed Jan. 20, 1995, now abandoned.

GOVERNMENTAL INTEREST

The invention described herein may be manufactured, used and licensed by or for the U.S. Government without payment to us of any royalty thereon.

BACKGROUND OF THE INVENTION

Phased array antennas can steer transmitted or received signals either linearly or in two dimensions without mechanically oscillating the antenna. These antennas are currently constructed using ferrite phase shifting elements. Due to the type of circuit requirements necessary to operate these antennas, they are costly, large and heavy. Therefore, their use has been limited primarily to military applications and, more particularly, to those applications which are strategically dependent on such capabilities. If ferroelectric materials could be used instead of ferrites, phased array antennas would be totally revolutionized.

Ferroelectric materials which are commonly used in the antenna arts are porous ceramics, whose properties are less than ideal for their intended application. Porous ceramics of the $Ba_{1-x}Sr_xTiO_3$ type are commonly employed in ceramic phase shifter antennas. However, these materials display certain deficiencies due to both the processing difficulties and expense, as well as their overall electronic and microwave properties. These deficiencies include electronic inhomogeneity, structural weakness, reproducibility and processing control, and large loss tangents.

The need therefore exists for a ceramic composite with graded electronic properties adjustable for particular applications, phased array antenna systems, for example.

These properties include (1) a graded dielectric constant; (2) low loss; and (3) tunability. The dielectric constant is a measure of the energy storage capability of a material, loss is a measure of the power dissipation as energy transits the material and tunability relates to the change in dielectric constant as a function of applied voltage.

Ferroelectric phase shifters require materials having high dielectric constants, especially at low frequencies (5–10 GHz). One obstacle that currently exists is the dielectric mismatch of air (dielectric constant, $\epsilon'=1$), and, for example, Barium Strontium Titanate ($BaTiO_3$—$SrTiO_3$), also referred to herein as BSTO, ($\epsilon'=3300$).

BRIEF DESCRIPTION OF THE INVENTION

The present invention deals with novel ceramic ferroelectric multilayer composites providing improved impedance matching and lower insertion losses in phased array antenna applications as well as reduced fringing effects in capacitors. The invention discloses a method for producing multilayer ferroelectric materials having built-in tunable matching layers. These materials combine layers of Barium Strontium Titanate ($BaTiO_3$—$SrTiO_3$) mixed with alumina ($Al_2O_3$), as disclosed in U.S. Pat. No. 5,312,790 (Sengupta et al), zirconia ($ZrO_2$), magnesia ($MgO$) or other low dielectric constant, low dielectric loss oxides in varying proportions to produce compositionally graded multilayer laminates. These layered materials are homogeneous, extremely dense, easily machinable, and possess superior electronic properties at both dc and microwave operating frequencies. Moreover, water absorption is less than 2% by weight, providing an environmentally stable material with good moisture and temperature stability.

Replacing the currently employed matching schemes with the novel ferroelectric multilayer composites described in the present invention improves the overall performance of phased array antenna systems while reducing the cost, weight and size.

Accordingly, it is an object of the present invention to fabricate a multilayered material exhibiting enhanced electronic properties.

It is a further object of the present invention to provide a graded multilayer ferroelectric material having a graded dielectric constant (built in impedance matching), a low loss, and some tunability.

It is a further object of the present invention to provide multilayered materials having selectively adjustable electronic properties for use in any discrete element phase shifter design.

It is a further object of the present invention to provide a graded multilayer ferroelectric material which is easily machinable and has no air gaps between the discrete layers.

Still, it is a further object herein to provide a ferroelectric material possessing superior electronic properties at dc, microwave and millimeter wave operating frequencies.

The aforesaid objects can be achieved individually and in combination and it is not intended that the invention be construed as requiring that two or more of said objects be combined.

The above and still further objects, features and advantages of the present invention will become apparent upon considering the following detailed description of preferred embodiments thereof, particularly when viewed in connection with the accompanying figures.

BRIEF DESCRIPTION OF THE DRAWINGS

In the drawings:

FIG. 1 is a schematic representation of the layer formulations and thicknesses for a BSTO-Alumina composite graded laminate stack according to the present invention.

FIG. 2 is a schematic representation of the layer formulations and thicknesses for a BSTO-Zirconia composite graded laminate stack according to the present invention.

DETAILED DESCRIPTION OF THE INVENTION AND DRAWINGS

Optimization of the electronic properties of multilayer ceramic materials for impedance matching applications involves the following parameters:

(1) Graded Dielectric Constant—Ideally the dielectric constant should be smoothly transitioned from the low dielectric constant of air ($\epsilon'=1$) to that of the chosen ferroelectric beam steering material.

(2) Low Loss: The loss tangent (intrinsic to the material) serves to dissipate or absorb the incident microwave energy and therefore is most effective in antenna applications when the loss tangent is in the range of 0.02 or less. The low loss tangent serves to decrease the insertion loss and hence increase the phase shift per decibel of loss. The operating frequency is controlled by the loss tangent.

(3) Maintenance of Some Tunability: The tunability of a particular material affects the degree to which the dielectric constant changes with applied voltage. The amount of phase shifting ability is directly related to the tunability; therefore, higher tunabilities are desired. Most matching layer schemes do not involve materials with any amount of tunability. However, the method described in the present invention maintains a moderate amount of tunability.

In the present invention low dielectric constant, low dielectric loss oxides are combined with $Ba_{1-x}Sr_xTiO_3$ (wherein x is greater than 0.00 and less then 0.75) in varying percentages to produce compositions having dielectric constants varying between the dielectric constants of pure $Ba_{1-x}Sr_xTiO_3$, or BSTO, and pure oxide. These compositions are then formed into tapes or thin layers having thicknesses selected to produce a capacitance across each layer approximately equal to that of the $Ba_{1-x}Sr_xTiO_3$ (BSTO) material, and the layers are arranged in order of increasing dielectric constant and laminated together. The type of transition from the dielectric constant of air ($\epsilon'=1.00$) through the laminate to the pure BSTO ($\epsilon'=3300$) depends on the number of layers and the incremental dielectric constants between layers, and can be designed to produce a smooth linear transition by laminating layers having equal increments of transition, or, alternatively, can be engineered to follow any function (exponential, etc.) to optimize impedance matching for specific applications.

The grading of the multiple layers with respect to dielectric constant is infinitely adaptable or adjustable by selectively varying the relative proportion of oxide to BSTO; by varying the particular oxide employed; and/or by adding varying amounts of very low dielectric constant polymer to oxide—BSTO compositions. The graded dielectric approach does not require precise control on the thickness of the layers to achieve impedance matching. Sufficient matching can be obtained from layers formed using standard economical techniques, such as tape casting described below.

A preferred group of low dielectric constant, low dielectric loss oxides includes alumina, zirconia and magnesia to produce $Ba_{1-x}Sr_xTiO_3$—$Al_2O_3$, $Ba_{1-x}Sr_xTiO_3$—$ZrO_2$ and $Ba_{1-x}Sr_xTiO_3$—MgO, respectively.

To produce the layers, powdered forms of Barium Titanate and Strontium Titanate, (Ferro Corporation, Transelco Division, Pen Yan, N.Y., product nos. 219–6 and 218, respectively) are stoichiometrically mixed to produce $BA_{0.6}Sr_{0.4}TiO_3$, or BSTO. The resulting BSTO is mixed with powdered forms of alumina (ALCOA Industrial Chemicals, Bauxite, Ark., distributed by Whittaker, Clark, and Daniels, South Plainfield, N.J., product No. A16-SG), zirconia, (Johnson Mattey Electronics, Ward Hill, Mass., product No. 11395) or magnesia (Johnson Mattey Electronics, Ward Hill, Mass., product No. 12287) in varying weight ratios.

Layers for use in a laminated graded stack are then processed via aqueous or non-aqueous based tape casting. Tape casting is a low-cost process for making high-quality laminated materials for which an adequate thickness control and a good surface finish are required. The process is directly related to slip casting that consists of preparing a stable slip of a ceramic powder in an aqueous or nonaqueous liquid. It is used for fabrication of a variety of ceramic substrates and multilayer capacitors. Tape casting is especially well suited to preparing wide, flat, uniform ceramic tapes with smooth surfaces, precise dimensional tolerances and adequate green strength (the ability of unfired material to remain intact and to withstand handling). This technique offers the flexibility of gradually altering the electronic properties of each layer to produce a gradual and continuous grading of the dielectric constant.

For each layer the proper BSTO/alumina or BSTO/zirconia mixture is combined into an aqueous based slurry using the procedure outlined in Table I.

An analogous procedure for preparing a BSTO/magnesia mixture as a non-aqueous slurry is shown in Table 2.

TABLE 1

Aqueous Based Slip Formulation

Step 1: Combine the following constituents and ball mill for 24 hours.
BSTO/oxide mixture 12 cc
Darvan C 0.12 g
Distilled $H_2O$ (Room Temp.) 17.50 g Step 2: Combine Methocel binder with hot distilled water in a separate container on a stirring plate. Add defoamer to remove any bubbles. Add cold distilled water and let set for several hours.
Methocel (20-214)⁺ 2.00 g
Distilled $H_2O$ (90° C.) 20.00 g
Distilled $H_2O$ (Room Temp.) 23.50 g
Defoamer B 2–3 drops Step 3: Add plasticizers to the BSTO/oxide mixture and mill for 2 hours.
glycerin 1.50 g
P-1200 (a polypropylene glycol marketed by Dow Chemical) .50 g Step 4: Add Methocel binder mixture to slip and mill for 1 hour.

TABLE 2

Non-aqueous Based Slip Formulation

Step 1: Combine following constituents and ball mill for 24 hours to deagglomerate and stabilize the powder in the solvent.
BSTO/magnesia mixture 12.5 cc
KD3 - dispersant 1.20 g
1,1,1 Trichloroethane 23.00 g
Anhydrous ethanol 9.00 g Step 2: Add binder and plasticizer to the slip and ball mill for approximately 3 hours to obtain a homogeneous suspension.
Polyethylene Glycol (PEG) 1.00 g
MW = 400
Octyl Phthalate 2.00 g
Polyvinyl Butyral (B98) 2.50 g
MW = 30,000

Following slurry preparation, the aqueous tapes are cast onto Plexiglass and non-aqueous tapes are cast on a teflon or silicon coated surface (often mylar) using an 8" doctor blade (Paul Gardener Co., Pompano Beach, Fla.) at a thickness calculated in accordance with the following equation:

$\epsilon' = Ct/A\epsilon_0$ where $\epsilon'$=dielectric constant of the layer

C=capacitance of BSTO t=thickness

A=area $\epsilon_0 = 8.8542 \times 10^{-12}$ F/m

The value of $\epsilon'$ for each layer is a function of the layer composition in terms of the percent by weight of BSTO, low dielectric constant oxide and polymer, if any.

After casting, aqueous-based tapes are placed in a humidity drying oven (Tabal Palatinous Rainbow P-3G) at 95% relative humidity and 35° C. for approximately 36 hours. The tapes are peeled from the Plexiglass once they are dry and are punched into ¾" circles. The circles are stacked in order of descending oxide content and placed in a steel die which is subsequently heated to between 150° and 400° C. A heated temperature of about 200° C. has proven effective. The stacks are then pressed uniaxially to between 5000 and 10,000 psi. A pressure of 7000 psi has proven successful. Sintering is then performed in a CM box furnace without additional applied pressure to produce the final stack of multilayered composite. Pressing can alternatively be achieved in a warm isostatic press heated to about 70° C.

Metallization of the resulting BSTO/alumina and BSTO/zirconia stacks is accomplished by painting two circular, aligned electrodes on each side of the specimens using high purity silver paint (SPI Supplies, West Chester, Pa.). Wires are then attached using high purity silver epoxy (Magnobond 8000, made by Magnolia Plastics, Inc., Chamblee, Ga.).

Electroding of the BSTO/magnesia stacks is accomplished by firing on electrodes to achieve optimum loss tangents for these materials. For example, screen print with silver conductive ink (FERRO #3350 distributed by Electronic Materials Division, Santa Barbara, Calif.) and subsequently fire at 450° for ten (10) minutes. The samples should then be dipped in a bath of 2% silver (Ag), 62% tin (Sn) and 36% lead (Pb) and soldered with lead clips attached.

The schematics of the layer formulations and layer thicknesses for two types of composite graded laminate stacks are shown in FIGS. 1 and 2. The layers are arranged in order of descending oxide content and variations in capacitance across the layers is maintained at an acceptable level by adjusting the layer thickness to insure a generally linear voltage profile across the tape layers, e.g., alumina-rich layers are much thinner than BSTO-rich layers.

Bulk samples corresponding to layer compositions are processed by adding Rhoplex B-60A (Rohm and Haas Co., Philadelphia, Pa.), a 3 wt. % organic binder consisting of an aqueous emulsion of acrylic polymer to the BSTO/oxide mixture. Each sample is then air-dried, pressed to approximately 7,000 psi., and sintered.

The density, porosity and absorption of three BSTO-alumina stacks ($Ba_{0.6}Sr_{0.4}TiO_3$—alumina) and one BSTO-zirconia stack ($Ba_{0.6}Sr_{0.4}TiO_3$—zirconia) according to the present invention are presented in Table 3 along with similar characteristics of the individual bulk ceramics corresponding to the layer compositions.

Table 4 presents measured electronic properties of the same stacks and bulk material.

TABLE 3

| Sample | Density (g/cc) | % Porosity | % Absorption |
|---|---|---|---|
| STACK #1 (BSTO-20% Alumina-BSTO) | 4.391 | 25.68 | 5.03 |
| STACK #2 (BSTO-60% Alumina-BSTO) | warped | 30.11 | 6.91 |
| STACK #3 (BSTO-100% Alumina-BSTO) | warped | 32.10 | 8.51 |
| STACK #4 (BSTO-100% Zirconia-BSTO) | 5.07 | 2.63 | 1.37 |
| Bulk Ceramics Corresponding to Layer Compositions | | | |
| 0 wt % $Al_2O_3$ | 5.373 | 3.16 | 0.48 |
| 1 wt % $Al_2O_3$ | 5.319 | 8.94 | 1.43 |
| 5 wt % $Al_2O_3$ | 4.744 | 6.63 | 1.10 |
| 10 wt % $Al_2O_3$ | 4.687 | 7.15 | 1.22 |
| 20 wt % $Al_2O_3$ | 4.222 | 7.81 | 1.46 |
| 30 wt % $Al_2O_3$ | 3.965 | 5.05 | 1.03 |
| 60 wt % $Al_2O_3$ | 3.797 | 5.47 | 1.20 |
| 80 wt % $Al_2O_3$ | 3.615 | 7.48 | 1.72 |
| pure $Al_2O_3$ | 3.992 | 4.44 | 0.95 |
| 1 wt % Zirconia | 5.22 | 10.31 | 1.64 |
| 5 wt % Zirconia | 5.28 | 8.86 | 1.51 |

TABLE 3-continued

| Sample | Density (g/cc) | % Porosity | % Absorption |
|---|---|---|---|
| 10 wt % Zirconia | 5.30 | 7.67 | 1.23 |
| 15 wt % Zirconia | 5.12 | 8.27 | 1.28 |
| 20 wt % Zirconia | 5.37 | 10.31 | 1.64 |
| 25 wt % Zirconia | 5.44 | 14.24 | 2.33 |
| 30 wt % Zirconia | 5.40 | 9.73 | 1.60 |
| 40 wt % Zirconia | 5.36 | 10.59 | 1.67 |
| 50 wt % Zirconia | 5.22 | 10.34 | 1.70 |
| 60 wt % Zirconia | 5.38 | 10.28 | 1.58 |

TABLE 4

BBTO (Ba = 0.60) Stacks and Bulk Samples

| Sample | Dielectric Constant | Loss Tangent | % Tunability | Electric Field (V/µm) |
|---|---|---|---|---|
| STACK #1 (BSTO-20 wt % Alumina) | 657.00 | 0.0236 | 13.00 | 0.70 |
| STACK #2 (BSTO-60 wt % Alumina) | 121.88 | 0.0202 | 0.35 | 0.70 |
| STACK #3 (BSTO-100 wt % Alumina) | 93.91 | 0.0210 | 0.65 | 0.70 |
| STACK #4 (BSTO-100 wt % Zirconia) | 198.03 | 0.0132 | 2.06 | 0.70 |
| Alumina Content (wt %) | | | | |
| 1.0 | 2606.97 | 0.0122 | | |
| 5.0 | 1260.53 | 0.0630* | 13.88 | 0.67 |
| 10.0 | 426.74 | 0.0163 | 4.79 | 0.39 |
| 15.0 | 269.25 | 0.0145 | | |
| 20.0 | 186.01 | 0.0181 | 3.58 | 0.48 |
| 25.0 | 83.07 | 0.0120 | | |
| 30.0 | 53.43 | 0.0135 | 5.13 | 2.21 |
| 35.0 | 27.74 | 0.0029 | | |
| 40.0 | 25.62 | 0.1616* | | |
| 60.0 | 16.58 | 0.0009 | 0.01 | 0.60 |
| 80.0 | 12.70 | 0.0016 | | |
| 100.0 | 8.37 | 0.0036 | | |
| Zirconia Content (wt %) | | | | |
| 0.0 | 3299.08 | 0.0195 | 19.91 | 0.73 |
| 1.0 | 2696.77 | 0.0042 | 46.01 | 2.72 |
| 5.0 | 2047.00 | 0.0138 | 12.70 | 0.76 |
| 10.0 | 1166.93 | 0.0111 | 7.68 | 0.68 |
| 15.0 | 413.05 | 0.0159 | | |
| 20.0 | 399.39 | 0.0152 | 5.39 | 0.76 |
| 25.0 | 273.96 | 0.0240 | 6.02 | 1.02 |
| 30.0 | 233.47 | 0.0098 | | |
| 35.0 | 183.33 | 0.0091 | 5.87 | 0.95 |
| 40.0 | 162.26 | 0.0095 | | |
| 50.0 | 92.73 | 0.0071 | 1.67 | 1.12 |
| 60.0 | 69.80 | 0.0098 | | |
| 80.0 | 17.31 | 0.0056 | | |
| 100.0 | 15.98 | 0.0018 | 0.05 | 0.27 |

Note:
*Samples had poor contacts

As shown in Tables 3 and 4, the present invention presents a family of layered ceramic BSTO-oxide composites to produce materials having graded dielectric constants and low loss characteristics while maintaining a reasonable measure of tunability. The method of fabrication of the present invention permits construction of materials having selectively adjustable electronic properties as well as environmental stability, a combination of features particularly suited to the requirements of phased array antennas.

While specific embodiments of the present invention have been shown and described, it will be obvious to those skilled in the art that changes and other modifications may be made without departing from this invention. For example, the invention may be modified to include other multilayer deposition techniques including thin film deposition (i.e. laser ablation, CVD, MOCVD, sputtering, or variations of these techniques) and thick film deposition (including screen printing, sol-gel processing, polymer precursors, and other variations). In addition, individual layers may consist of BSTO combined with two or more oxides, for instance a mixture of alumina and zirconia Also other ceramic-ceramic composites of BSTO and other low dielectric constant materials can be used to fabricate the graded multilayer laminates depending upon the particular requirements of the intended application and variations in the oxide morphology, including microballoons, whiskers, fibers, platelets, fabrics and mats, can be used to further tailor the dielectric properties.

The layers may also consist of a transition from one BSTO/oxide system to another. For example a transition from BSTO to BSTO/magnesia to BSTO/alumina to alumina could be required for a specific application. If impedance matching below the dielectric constant of alumina ($\epsilon'=9$) is required then this can be facilitated by integrating a BSTO/oxide system into a suitable polymer such as epoxy or a low dielectric form of silica. The BSTO/polymer composites could be used in these multilayered structures or singly as the principle component.

It is, therefore, intended that the claims herein are to include all such obvious changes and modifications as fall within the true spirit and scope of this invention.

What is claimed is:

1. A laminated ceramic ferrolectric material having a graded dielectric constant comprising a plurality of adjacent layers, said layers having no air gaps between the discrete layers and formed of a composition comprising 0 to 100% of $Ba_{1-x}Sr_xTiO_3$ wherein x is greater than 0.0 but less than 0.75, and 100 to 0% by weight of at least one low dielectric constant low dielectric loss oxide selected from the group consisting of $Al_2O_3$, $ZrO_2$ and MgO, wherein the ratio of said $Ba_{1-x}Sr_xTiO_3$ to said oxide is different in each layer, said layers being arranged in order of decreasing dielectric constant and laminated together.

2. The laminated ceramic ferroelectric material of claim 1 wherein the thickness of said layers varies inversely with the barium-strontium-titanate content of said layers.

3. The laminated ceramic ferroelectric material of claim 1 wherein the thickness of each of said layers is selected to produce a constant capacitance across each of said layers.

4. The laminated ceramic ferroelectric material of claim 3 wherein the thicknesses of said layers are determined in accordance with the equation $\epsilon'=Ct/A\epsilon_0$ where $\epsilon'$ is the dielectric constant of said layer, C is the capacitance of barium-strontium-titanate, t is the thickness of said layer, and A is the area of said material.

5. The laminated ceramic ferroelectric material of claim 1 wherein said ratios of $Ba_{1-x}Sr_xTiO_3$ to oxide are selected and arranged to produce a linear grading of dielectric constant.

6. The laminated ceramic ferroelectric material of claim 1 wherein said ratios of $Ba_{1-x}Sr_xTiO_3$ to oxide are selected and arranged to produce increments of dielectric grading following a predetermined non-linear function.

7. The laminated ceramic ferroelectric material of claim 1 wherein said low dielectric constant, low dielectric loss oxide is selected from the group consisting of alumina, zirconia, magnesia and mixtures thereof.

8. The laminated ceramic ferroelectric material of claim 1 wherein said layers are laminated together by heating said arranged layers to a temperature in the range of 150° to 400° C., uniaxially pressing said layers to a pressure in the range of 5000 to 10,000 psi and sintering said layers.

9. The laminated ceramic ferroelectric material of claim 1 wherein said layers are laminated together by pressing said layers in a warm isostatic press to a pressure in the range of 5000 to 10,000 psi at a temperature of about 70° C. and sintering said layers.

10. A laminated ceramic ferrolectric material having a selectively graded dielectric constant comprising a plurality of adjacent layers; said layers having no air gap between the discrete layers, each formed of composition of materials selected from the group consisting of $Ba_{1-x}Sr_xTiO_3$ where x is greater than 0.00 but less than 0.75, at least one dielectric constant, low dielectric loss oxide and a low dielectric constant, low dielectric loss adjusting material, wherein the total combined % by weight of said $Ba_{1-x}Sr_xTiO_3$, said oxide and said adjusting material equals 100% and each of said compositions contain a different ratio of said materials to produce layers having different dielectric constants; said layers being arranged in order of of decreasing dielectric constant and laminated together.

11. The laminated ceramic ferroelectric material of claim 10 wherein said low dielectric constant, low dielectric loss adjusting material is selected from the group consisting of polymer and silica and mixtures thereof.

12. The laminated ceramic ferroelectric material of claim 10 wherein said ratios of $Ba_{1-x}Sr_xTiO_3$, said oxide and said adjusting material are selected to produce selected increments of dielectric grading and said layers are arranged to follow a predetermined mathematical function.

13. The laminated ceramic ferroelectric material of claim 10 wherein said oxide is selected from the group consisting of alumina, zirconia and magnesia, mixtures thereof.

14. The laminated ceramic ferroelectric material of claim 10 wherein said layers are laminated together by heating said arranged layers to a temperature in the range of 150° to 400° C., uniaxially pressing said layers to a pressure in the range of 5000 to 10,000 psi and sintering said layers.

15. The laminated ceramic ferroelectric material of claim 10 wherein said layers are laminated together by pressing said layers in a warm isostatic press to a pressure in the range of 5000 to 10,000 psi at a temperature of about 70° C. and sintering said layers.

16. The laminated ceramic ferroelectric material of claim 10 wherein said adjusting material comprises 0 to 20% by weight of the total material weight.

* * * * *